(12) United States Patent
Huenermann

(10) Patent No.: US 7,779,652 B2
(45) Date of Patent: Aug. 24, 2010

(54) METHOD AND APPARATUS FOR PRODUCING A GLASS BODY

(75) Inventor: Michael Huenermann, Alzenau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 1165 days.

(21) Appl. No.: 11/373,414

(22) Filed: Mar. 9, 2006

(65) Prior Publication Data

US 2006/0207295 A1 Sep. 21, 2006

(30) Foreign Application Priority Data

Mar. 15, 2005 (DE) ........................ 10 2005 012 232

(51) Int. Cl.
*C03B 37/018* (2006.01)
(52) U.S. Cl. .......................... 65/421; 65/413
(58) Field of Classification Search .................. 65/413, 65/421, 484, 377
See application file for complete search history.

(56) References Cited

U.S. PATENT DOCUMENTS

| 4,684,384 A | 8/1987 | Berkey |
| 6,047,564 A | 4/2000 | Schaper et al. |
| 2005/0155388 A1 * | 7/2005 | Burke et al. .................. 65/392 |
| 2006/0048546 A1 | 3/2006 | Hunermann |

FOREIGN PATENT DOCUMENTS

| DE | 196 28 958 A1 | 1/1998 |
| DE | 102 51 390 A1 | 2/2004 |
| WO | WO 2004/039737 A1 | 5/2004 |

* cited by examiner

*Primary Examiner*—Queenie Dehghan
(74) *Attorney, Agent, or Firm*—Tiajoloff and Kelly LLP

(57) ABSTRACT

The invention starts from a known method for producing a glass body, comprising forming a cylindrical blank by successive deposition of a plurality of material layers on the outer surface of a substrate body which is rotating about its longitudinal axis, by using an arrangement of a plurality of depositors which are directed onto the substrate body and which are fed via supply lines with process media for material layer deposition and which are moved without a reversing movement relative to the longitudinal axis of the substrate body. Starting therefrom, to provide a method for producing a glass body of high homogeneity that can be realized in a constructionally simple way, the invention suggests that the movement of the depositor arrangement along the longitudinal axis of the substrate body should be accompanied by a displacement of the substrate body. An apparatus suited for performing the method is distinguished by a displacement device for a displacement of the soot body which is accompanied by the movement of the depositor arrangement along the longitudinal axis of the substrate body.

16 Claims, 5 Drawing Sheets

METHOD AND APPARATUS FOR PRODUCING A GLASS BODY

Figure 1:
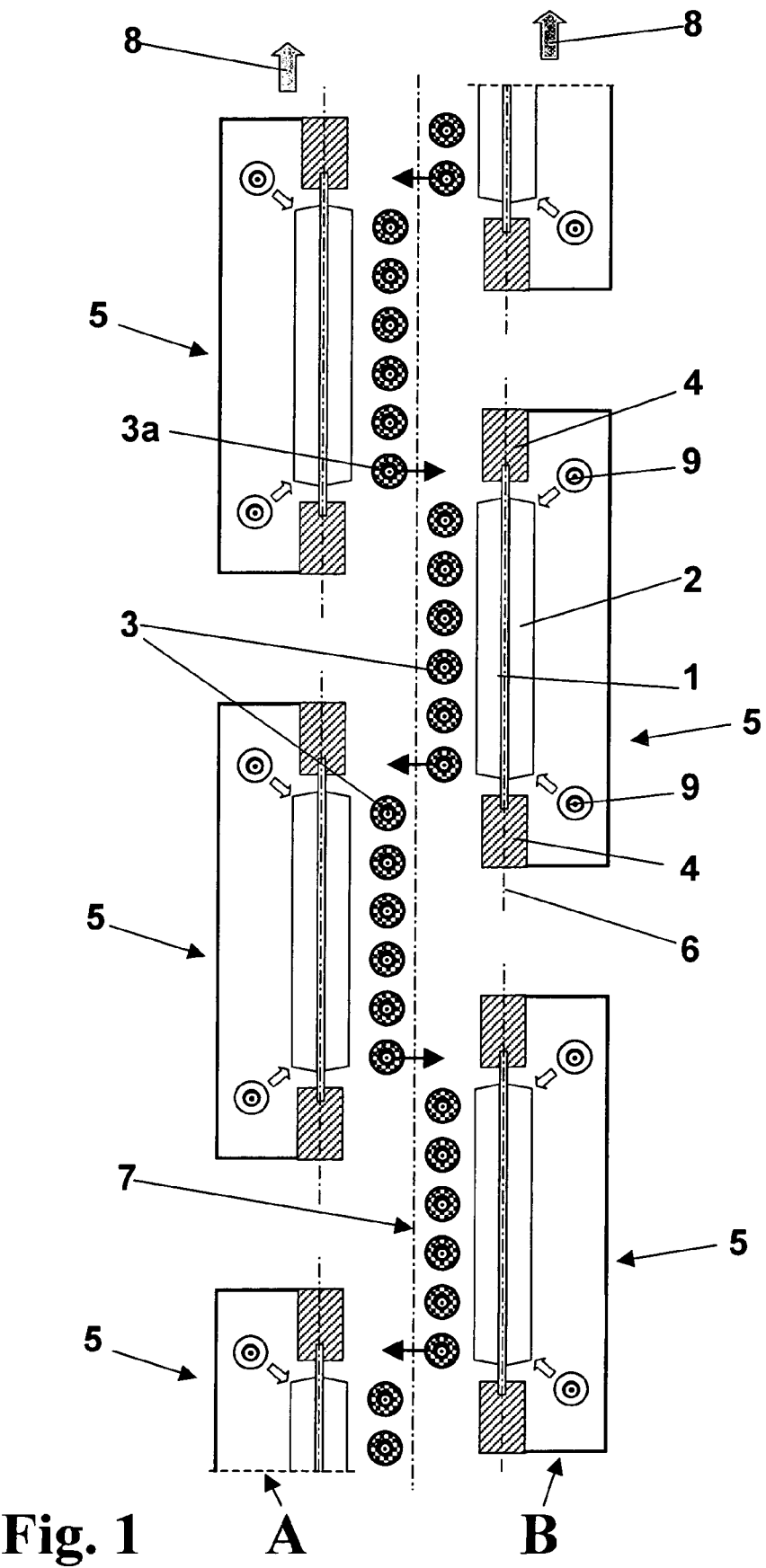

The present invention relates to a method for producing a glass body, comprising forming a cylindrical blank by successive deposition of a plurality of material layers on the outer surface of a substrate body which is rotating about its longitudinal axis, by using an arrangement of a plurality of depositors which are directed onto the substrate body and which are fed via supply lines with process media for material layer deposition and which are moved without a reversing movement relative to the longitudinal axis of the substrate body.

Furthermore, the present invention relates to an apparatus for performing the method, comprising a depositor arrangement consisting of a plurality of depositors which are connected to supply lines for the supply of process media for material layer deposition and which are movable without a reversing movement along the longitudinal axis of at least one substrate body which is rotatable about its longitudinal axis.

The glass body is obtained by further processing a preliminary product in the form of a cylindrical blank which is produced by successively depositing material layers on a substrate body. The further processing of the blank includes a chemical, thermal or mechanical after-treatment of the blank, for instance doping, vitrifying, annealing, plastic deformation steps, grinding, cutting, complete or partial removal of the soot body, or the like.

The blank is particularly a tube or a rod of any desired cross-sectional profile made from transparent glass, porous glass (glass soot) or a composite body consisting of said groups of materials.

The substrate body is a rod-shaped or tube-shaped body of graphite, of a ceramic material such as aluminum oxide, of glass, particularly quartz glass, or of doped or undoped porous $SiO_2$ soot. After the deposition process the substrate body is removed or it forms an integral part of the blank.

The depositors are burners as are e.g. used in the manufacture of synthetic quartz glass, particularly flame hydrolysis burners or plasma burners, or devices for applying layers of material by piling up, injection or spraying, particularly for thermal injection and spraying.

The glass body obtained according to one method is used as a finished or semifinished product for many applications, for instance in optical fields, in lamp manufacture, semiconductor manufacture, in the manufacture of chemical equipment or in optical fiber production. It consists of transparent glass, particularly quartz glass which may be doped with other substances, such as titanium, aluminum, boron, germanium, chlorine, fluorine, for achieving special properties.

Synthetic quartz glass is often produced according to the known OVD (outside vapor deposition) method by flame hydrolysis of suitable silicon-containing start components using a deposition burner by means of which the $SiO_2$ particles are formed and deposited on the cylindrical outer surface of a rotating substrate body. For increasing the deposition rate a plurality of deposition burners are combined to form a row of burners which is reciprocated in parallel with the soot body surface from one end of the developing blank to the opposite end. In this procedure, however, outwardly conically terminating end portions of the blank are formed that have a length increasing with the length of the row of burners and that are unusable as a rule.

For the solution of this problem DE 196 28 958 A1 suggests that a burner arrangement should be reversingly reciprocated along the longitudinal axis of the carrier such that each deposition burner only sweeps over a small portion of the surface of the developing blank. This produces short tapered end portions, but inhomogeneities arise in the areas around the turning points of the burner movement due to local changes in temperature, mass application or density. Moreover, differences in the deposition characteristics of various deposition burners have locally different effects on the surface temperature and on mass application, whereby inhomogeneities are also caused. Inhomogeneities may be noticed in an unfavorable way during further processing of the blank and thus be detrimental to the quality of the glass body obtained from the blank.

These drawbacks are avoided in a method according to U.S. Pat. No. 4,684,384 A which also deals with the simultaneous production of several $SiO_2$ blanks of porous quartz glass in one operation. To this end a plurality of deposition burners are provided which, while successively circulating around a closed loop, deposit $SiO_2$ particles on the carriers which are arranged around the loop and rotate about their longitudinal axis. The respective blank ends are obtained in this method in that during their circulation around the loop all deposition burners pivot one after the other away from the respective carrier in order to be moved to the next carrier. In this process the deposition burners do not change their direction of movement so that all deposition burners pass through the same loop positions time and again.

Although this procedure is distinguished by a high deposition rate together with a high homogeneity of the resulting $SiO_2$ blanks and the glass bodies made therefrom, the recurring circular movement of the deposition burners requires the use of a rotary leadthrough for the supply of the media flows to the deposition burners to avoid torsion of the individual media supply lines and a twisting among them.

Such a constructionally very complicated rotary leadthrough for the supply of process media is avoided by the suggestion made in DE 102 51 390 A1, which also discloses a method and an apparatus of the above-mentioned type. This document is concerned with a method for producing porous $SiO_2$ blanks by means of OVD flame hydrolysis methods using a row of deposition burners that are transported without reversal in their direction of movement around a closed path of movement along which the one carrier or several carriers are arranged. To avoid twisting of the media supply lines and an accompanying shearing or tearing off of the lines, it is suggested that the deposition burners in their sequence of movement should pass through a path of movement in the form of a double loop which has a path section with a twisting of the media supply lines to the right and a further path section with a twisting of the media supply lines to the left, so that right twisting and left twisting cancel each other after each passage through the path of movement.

The realization of the loop-like path of movement still requires constructionally complicated measures, for instance in the area of the points of intersection of the double loop.

It is therefore the object of the present invention to provide a further method for producing a glass body of high homogeneity using an arrangement of depositors, with a reciprocating movement of the depositor arrangement relative to the longitudinal axis of the substrate body being avoided.

Furthermore, it is the object of the present invention to provide a constructionally simple apparatus for performing the method of the invention.

As for the method, this object starting from the method indicated at the outset is achieved according to the invention in that the movement of the depositor arrangement along the longitudinal axis of the substrate body is accompanied by a displacement of the substrate body.

The method according to the invention concerns processes for depositing material layers on a substrate body without a reversing movement of the depositor arrangement or of the substrate body rotating about its longitudinal axis, i.e. without a reversal of the direction of movement of the relative movement relative to one another, as is also known in the generic method. In contrast to the known method, however, the relative movement between the substrate body and the depositor arrangement is not exclusively based on a movement of the depositor arrangement along the substrate body surface, but it is accompanied by a displacement of the substrate body itself.

In contrast to the known method, a twisting of the supply lines for process media (also called "media supply lines" in the following) is not continuously remedied under great efforts, but twisting is prevented or kept at an acceptable degree right from the start by avoiding a twist-generating movement of the depositor arrangement and, instead of this, the substrate body (bodies) is (are) moved or a compensating movement is performed. Although supply lines are also needed for the movement of the substrate body and the blank formed thereon, for instance electrical feed lines for carrying out and controlling rotation about the longitudinal axis of the substrate body, it is much easier under constructional aspects to avoid a twisting of the electrical feed lines than is possible with media supply lines.

The "displacement" of the substrate body in this context means a translational displacement of the whole substrate body or a rotational displacement at least of its front ends in a plane along a path of any desired shape, especially along a straight, curved or closed path or a path that is circular in a specific case. The depositors are arranged to be stationary or movable along the path of movement of the substrate body or at least along a section of the path of movement, the movement of the depositors being limited to such movements that produce no or at best a slight twisting of the media supply lines or that reduce, avoid or counteract a twisting.

The realization of a relative movement between the depositor arrangement and the substrate body by a displacement of the substrate body through a translational displacement of the substrate body in the direction of its longitudinal axis may require a lot of space. This is avoided by a preferred variant of the method of the invention in which the displacement comprises a rotation of the substrate body around a rotational axis extending in a direction transverse, preferably perpendicular, to the longitudinal axis of the substrate body.

The relative movement between substrate body and depositor arrangement is accompanied in this variant of the method by a rotational displacement of the substrate body ends or the whole substrate body in a plane of rotation, the rotation being carried out about a rotational axis which is not identical with the longitudinal axis of the substrate body. The rotational axis need not intersect the substrate body. The rotational axis extends in a direction transverse, in the simplest case perpendicular, to the longitudinal axis of the substrate body, so that each of the two substrate body ends describes a closed circular path in the plane of rotation. The space requirement is here substantially limited to the diameter of the circular path or, if necessary, to the diameter of the larger one of the two circular paths.

Due to its rotational displacement by rotation, the substrate body is moved along the depositor arrangement. To achieve a uniform deposition and a high degree of homogeneity of the developing blank, attention must be paid that the depositors are directed onto the substrate body at about the same angle and also act on the substrate body at about the same distance.

These conditions are met in a particularly elegant manner by a procedure in which the depositor arrangement is rotated together with the at least one substrate body continuously about the rotational axis, the depositors being simultaneously transported continuously around a circulating path in opposite direction relative to the displacement of the depositor arrangement effected by the rotation.

In this instance, the depositors of the depositor arrangement are transported around a circulating path, the arrangement being simultaneously rotated together with the at least one substrate body about the rotational axis. The circulating path has at least one section in which the depositors extend along the longitudinal axis of the substrate body and in which they effect deposition of material layers. Since the circulating path is displaced together with the substrate body continuously about the rotational axis, maintenance of the opposite orientation can be easily guaranteed. A twisting of the media supply lines due to rotation of the whole depositor arrangement about the rotational axis is compensated by the transportation of the depositors around the circulating path, which transportation takes place in the reverse sense of rotation.

It has turned out to be particularly advantageous when the depositors are transported on the circulating path at an independently adjustable speed.

As a result, the depositors can be transported on path sections where no deposition of material layers takes place, at a higher speed to the next path section. Path sections without deposition of material layers can thus show a lower occupation density of depositors than path sections with material layer deposition, which reduces the costs for material and for consumption.

A further improvement is achieved when a plurality of substrate bodies are combined to form a substrate body arrangement, having a fixed shape, whereby the longitudinal axes of the substrate bodies extending in a joint substrate body plane, and the substrate body arrangement is rotated about a rotational axis extending in a direction transverse, preferably perpendicular, to the substrate body plane.

Since material layers are deposited on a plurality of substrate bodies that are moved along the depositor arrangement, the efficiency of the method is improved. As has been explained above, the depositor arrangement can be rotated together with the substrate bodies about the rotational axis, the depositors being at the same time continuously "transported back" in opposite direction relative to the rotational direction of the depositor arrangement around a circulating path, with sections of said circulating path extending along the longitudinal axes of the substrate bodies on which material layers are deposited.

It has turned out to be useful when upon rotation about the rotational axis position or shape of the depositor arrangement is continuously adapted to shape or position of the substrate body arrangement.

This has the effect that the depositors of the depositor arrangement are always optimally aligned with the longitudinal axes of the substrate bodies.

In this respect a variant of the method has turned out to be particularly useful in which the substrate bodies of the substrate body arrangement are arranged in the substrate body plane along the sides of a polygon, and in which the depositor arrangement is supported in a depositor plane extending in parallel with the substrate body plane, and the depositors are transported in a circulating path along the substrate body arrangement continuously in opposite direction relative to the displacement of the depositor arrangement caused by the rotation.

The circulating depositor path assumes, at least in part, the shape of the polygon generated by the substrate body. The arrangement of the substrate bodies in such a way that they are arranged in the substrate body plane along the sides of a polygon permits an optimization of the depositor arrangement with respect to a length that is as short as possible and with respect to a sequence of path sections that is as uninterrupted as possible, on which path sections a material layer deposition is carried out. The relative movement between the depositors and the substrate bodies is effected by the continuous rotation of the substrate body arrangement and the depositor arrangement about the rotational axis with simultaneous continuous return movement of the depositors on the circulating path in opposite direction.

This does not require that all sides of the polygon must be occupied with substrate bodies or blanks. In a particularly preferred variant of the method, two parallel-arranged substrate bodies form a substrate body arrangement, the substrate bodies being arranged at the long sides of a rectangle.

A holding device is needed at both sides of the substrate body ends for supporting and holding the substrate body, and also for executing the rotation about the longitudinal axis. This holding device projects beyond the front ends of the blank forming on the substrate body. In the case of a parallel arrangement or an approximately parallel arrangement of the substrate bodies, as in this preferred embodiment, said holding devices do not impede one another. The circulating path of the depositor arrangement extends at any rate along the deposition portions of the two substrate bodies. Although the path extension may otherwise be in any desired way, it is advantageously as short as possible and therefore follows the rectangle generated by the substrate bodies. On the path portions outside the deposition portions, the media supply to the depositors can be stopped altogether or in part. Moreover, the depositors can be transported on this path portion at an accelerated pace, on condition that the transportation speed of the depositors can be adjusted separately.

Ideally, a complete rotation of the substrate body arrangement and the depositor arrangement by 360° is accompanied by a complete circulation of the depositor arrangement around the circulating path.

This ensures that upon completion of each circulation the media supply lines show the same twisted state as at the beginning. An increase in the degree of twist is ruled out.

It has turned out to be particularly advantageous when the rotational axis extends in vertical direction.

A rotation of the substrate arrangement about a vertical rotational axis can be realized in a constructionally comparatively easy way. Moreover, in this case the plane in which the longitudinal axes of the substrate bodies are located (substrate body plane) extends in horizontal direction, which facilitates the deposition of the material layers by depositors arranged above or underneath the substrate body plane when gravity and thermal lift have an effect on material layer deposition as is for instance the case with spraying or piling methods or in flame deposition methods.

In a further and equally preferred variant of the method according to the invention, the depositor arrangement forms at least one depositor path with a length greater than the length of the blank to be produced, the displacement of the at least one substrate body taking place in the direction of its longitudinal axis along the depositor path, and measures being taken for preventing material deposition in the area outside the blank ends.

In this variant of the method the depositor path extends over a length much larger than the substrate body length. Due to the linear displacement towards the longitudinal axis of the substrate body, the at least one substrate body is moved along the depositor path, the layerwise material deposition being carried out by means of the depositors on the outer surface of the substrate body and on the developing blank, respectively.

The blank has a predetermined length. Further material deposition is avoided or reduced at the two front ends of the blank. The measures suited therefor are generally known from the prior art; for instance in a depositor directed towards an area outside of the deposition area predetermined by the blank, the supply of material can be stopped or the depositor is pivoted away, or monitoring means are provided that prevent further deposition on the substrate body outside the area of the blank.

A further improvement is achieved when a plurality of substrate bodies form a build-up or assembly path and pass through the depositor path in successive order.

Since a plurality of substrate bodies pass through the depositor path, the efficiency of the method is enhanced.

As for efficiency, it has also turned out to be particularly useful when at both sides of the depositor path an assembly path is provided with blanks arranged relative to each other in gapwise configuration, the depositors being alternately directed onto substrate bodies of the one and the other assembly path.

Two assembly paths are here provided that extend in parallel with each other and with the depositor path. The depositor path is provided above, underneath or between the assembly paths. The depositors arranged on the depositor path are pivotable, tiltable or preferably movable in a direction transverse to the direction of the path, so that they can be alternately directed towards substrate bodies of the one assembly path and of the other assembly path.

The term "gapwise" means that on both sides of the depositor path an assembly path is provided, each being formed by successively arranged blanks passing through the depositor path and maintaining a vacancy between each other, whereby the blank of one of the assembly paths is arranged adjacent to the vacancy of two consecutive blanks of the other assembly path, such that the depositors being alternately directed onto substrate bodies of the one and the other assembly path.

In the simplest case the number of depositors, the length of the depositor path and the speed of the displacement of the at least one substrate body are chosen such that the method step of successively depositing a plurality of material layers for forming the blank is completed when the substrate body has passed through the depositor path once.

Although this variant of the method requires an adequately long deposition path, the need for a return movement of the substrate body to the beginning of the depositor path is avoided, which is accompanied by variations in process parameters, such as the temperature or surface quality of the blank. This variant of the method therefore contributes to the production of particularly homogeneous blanks and glass bodies.

As an alternative, it is intended in a further preferred procedure that the substrate bodies pass repeatedly through the depositor path for forming the blank.

In comparison with the above-described variant, this permits shorter depositor paths, but it has turned out to be useful that the developing blank is heated before repeated passage through the depositor path.

Due to the heating of the blank before the renewed passage through the depositor path, defined temperature conditions are created each time, which is of particular importance to material deposition operations in which the surface temperature of the developing blank has a noticeable effect on the deposition conditions.

In a further preferred variant of the method according to the invention, the depositor arrangement comprises at least two depositor paths, the displacement of the at least one blank taking place in the direction of the longitudinal axes of the substrate bodies along a circulating path.

In this variant of the method, it is intended that the at least one substrate body is subjected to a displacement in the direction of its longitudinal axis in which it describes a circulating displacement path along which at least two depositor paths are provided, with material layers being deposited on the outer surface of the substrate body or the outer surface of the developing blank during movement along the depositor paths. Hence, the at least two depositor paths are arranged along the path of displacement of the substrate body.

In this variant of the method measures are also taken that prevent material deposition in the area outside the front-sided ends of the blank, and said measures in the simplest case may also consist in that the developing blank is transported from the first depositor path to the second one, and the ends of the blank are thus withdrawn from the area of action of the depositors of the first deposition path.

In a particularly preferred procedure, the at least two depositor paths extend in parallel with each other and have a plurality of successively arranged substrate bodies passing through them in that the substrate bodies are transferred from the end of the one depositor path to the beginning of the other depositor path.

The at least two depositor paths are here passed through by a plurality of substrate bodies in successive order in a spatially opposite direction in that when reaching the end of the one depositor path the substrate bodies are supplied, starting with their front end, to the other depositor path extending in parallel and are then moved along said path. The parallel arrangement of the two depositor paths permits a transfer that is as fast as possible from the one depositor path to the other one so that the necessary transfer entails a change in relevant process parameters that is as small as possible, such as for instance the surface temperature of the developing blanks.

Nevertheless, to compensate temperature changes that have arisen, it has turned out to be advantageous for the above reasons when the blank is heated after transfer from the one to the other depositor path.

In the thermally variable deposition processes, the depositors are deposition burners, and in the process the surface of the blank is heated. To avoid cooling of the blank surface during transfer from the one to the other depositor path the transfer process takes place as fast as possible. For compensating a temperature drop that has arisen after all before the deposition process is resumed, the blank is first heated, this being done in the easiest case by using the existing deposition burners of the depositor path in that these are used in a preheating phase as pure burners for heating the blank without deposition of material layers.

Alternatively or in addition, it has turned out to be useful when during transfer of the substrate body from the end of the one depositor path to the beginning of the other depositor path deposition of the material layers continues.

This can e.g. be accomplished in that during transfer of the substrate body the last burners of the one depositor path together with the substrate body switch over to the other depositor path, the relative movement between substrate body and depositor being maintained. With a progressive soot body movement the depositors are again transported back to their original depositor path.

It has turned out to be particularly advantageous when deposition burners are used as depositors that are fed with starter material for the material to be deposited, the supply of the starter material being individually adjustable for each deposition burner.

The separately adjustable supply of the starter material permits, for instance, the individual disconnection of the supply of the starter material when the deposition burner in question is directed onto an area outside the ends of a developing blank. The same measure can also make sense for other process media, e.g. for the supply of a fuel or an oxidant to be able to adjust and vary the temperature of the deposition burner individually.

For the above-mentioned reason, it has turned out to be particularly advantageous when the supply of the starter material for each deposition burner is adjustable in response to the position of the substrate body.

Furthermore, it has turned out to be advantageous when electric additional heaters are provided which heat the front ends of the developing blank and are displaced in stationary fashion with the substrate body.

The electric additional heaters serve to keep the ends of the developing blank at a high temperature and to consolidate the blank thermally in this process, whereby an increased mechanical stability can be achieved for the developing blank. The additional heaters are displaced in a translational movement together with the respective substrate body. They are not equipped with media supply lines that could be twisted due to the displacement of the substrate body, but the additional heaters are electrically operated.

As for the apparatus, the above-mentioned object starting from an apparatus of the above-mentioned kind is achieved according to the invention in that a displacement device is provided for a displacement of the soot body which is accompanied by the movement of the depositor arrangement along the longitudinal axis of the substrate body.

The apparatus serves to perform the method of the invention for depositing material layers on a substrate body without a reversing movement of the depositor arrangement or of the substrate body rotating about its longitudinal axis. The generation of a relative movement of the substrate body along the depositors comprises a translational or rotational displacement of the substrate body in a plane. To this end the apparatus of the invention comprises a displacement device for the substrate body which permits a displacement of the substrate body along any desired path of movement in a plane, particularly along a straight, curved or closed path of movement or a path of movement which is circular in a specific case. Along the path of movement of the substrate body or at least along a section of the path of movement the depositors are arranged to be stationary or moveable, the movement of the depositors being limited to movements that do not produce any twisting or at best produce a slight twisting of the media supply lines, or to movements that reduce or avoid twisting.

Since in contrast to the depositor arrangement the displacement device is not necessarily connected to the media supply lines, the movement of the substrate body using the displacement devices turns out to be constructionally simpler than the realization of a circulating movement by the depositors, as suggested in the prior art.

As for the definition of a "displacement" of the substrate body, reference is made to the above explanations regarding the method of the invention.

Advantageous developments of the apparatus of the invention become apparent from the dependent claims. Insofar as the configurations of the apparatus described therein imitate the procedures outlined in the dependent claims regarding the method of the invention, reference is made for an additional explanation to the above observations made on the corresponding dependent claims.

Further advantageous modifications of the apparatus of the invention are explained in the following:

In a preferred embodiment of the apparatus of the invention, the displacement device comprises a rotary device for rotating the substrate body about a rotational axis extending in a direction transverse, preferably perpendicular, to the longitudinal axis of the substrate body.

With the help of the rotary device a rotational displacement of the substrate body front ends or of the whole substrate body is created in a plane of rotation on which the relative movement between substrate body and depositor arrangement is based fully or in part. There is no need that the rotational axis intersects the substrate body. The rotational axis extends in a direction transverse, in the simplest case perpendicular, to the longitudinal axis of the substrate body, so that each of the two substrate body ends describes a closed circular path in the rotational plane. The space requirement is limited in this embodiment essentially to the diameter of the circular path or optionally to the diameter of the larger one of the two circular paths.

Due to its rotational displacement by rotation the substrate body is moved along the depositor arrangement. Attention must here be paid for the purpose of uniform deposition and high homogeneity of the developing blank that the depositors are directed at an approximately identical angle to the substrate body and also act on the substrate body at about the same distance.

The conditions are met in a constructionally particularly efficient manner by a rotary device which is configured for the joint rotation of the depositor arrangement with the at least one substrate body, the depositors being provided with a drive by means of which they can be transported around a circulating path in opposite direction relative to the displacement of the depositor arrangement effected by the rotation.

In this case the depositors of the depositor arrangements can be transported by means of a drive around a circulating path and at the same time by means of the rotary device about the rotational axis. The circulating path comprises at least one section in which the depositors extend along the longitudinal axis of the substrate body, and in which they effect a deposition of material layers. Since the circulating path of the depositor arrangement together with the substrate body is displaced continuously about the rotational axis, maintenance of the mutual orientation is ensured in an easy way. A twisting of the media supply lines due to the rotation of the whole depositor arrangement around the rotational axis is compensated by the transportation of the depositors in the inverse sense of rotation around the circulating path.

It has turned out to be particularly advantageous when the depositors are interconnected in the manner of a chain, with the drive acting on the depositor chain.

Due to the chain-like connection of the depositors a drive for moving the depositors along their circulating path is adequate. The chain-like connection ensures a permanently constant distance between the depositors, and it additionally permits some flexibility and movability by virtue of which different forms of the circulating paths can be realized in a simple manner.

Preferably, the drive comprises a drive chain by means of which the depositors are interconnected. A drive chain is a simple and reliable component which can be easily formed into a polygon of any desired shape by virtue of the angular movability of the individual chain members, with corresponding support points being provided on the corners of the polygon. The drive chain extends between the support points along straight paths that are suited as depositor paths within the meaning of the present invention.

Alternatively or in addition, the drive comprises a rigid guide rail on which the depositors are slidingly supported.

The guide rail ensures a guiding of the depositors in an accurate position and can e.g. compensate the deflection of a drive chain.

Advantageously, the displacement device comprises a mount for the substrate body and a rotational device for rotation of the substrate body about its longitudinal axis, with heating elements being provided in the area of the mount for heating the ends of the blank.

With the help of the heating elements a consolidation of the ends of the blank and a mechanical stabilization are achieved.

The depositors are for instance deposition burners which are fed with starter material for the material, with fuel and an oxidant, said burners being directed towards the longitudinal axis of the substrate body, preferably inclined at an angle of not more than 30° to the vertical.

Figure 2:
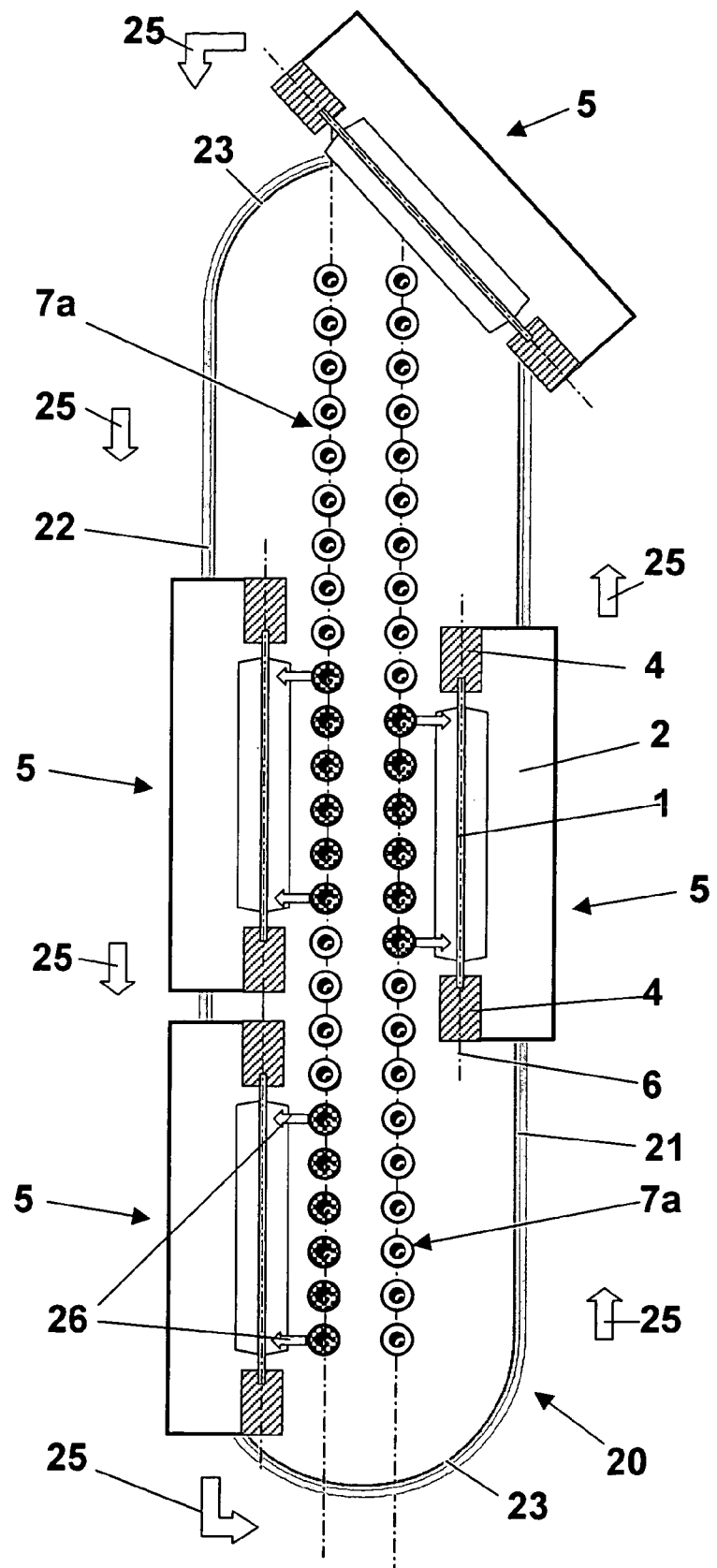
Figure 3:
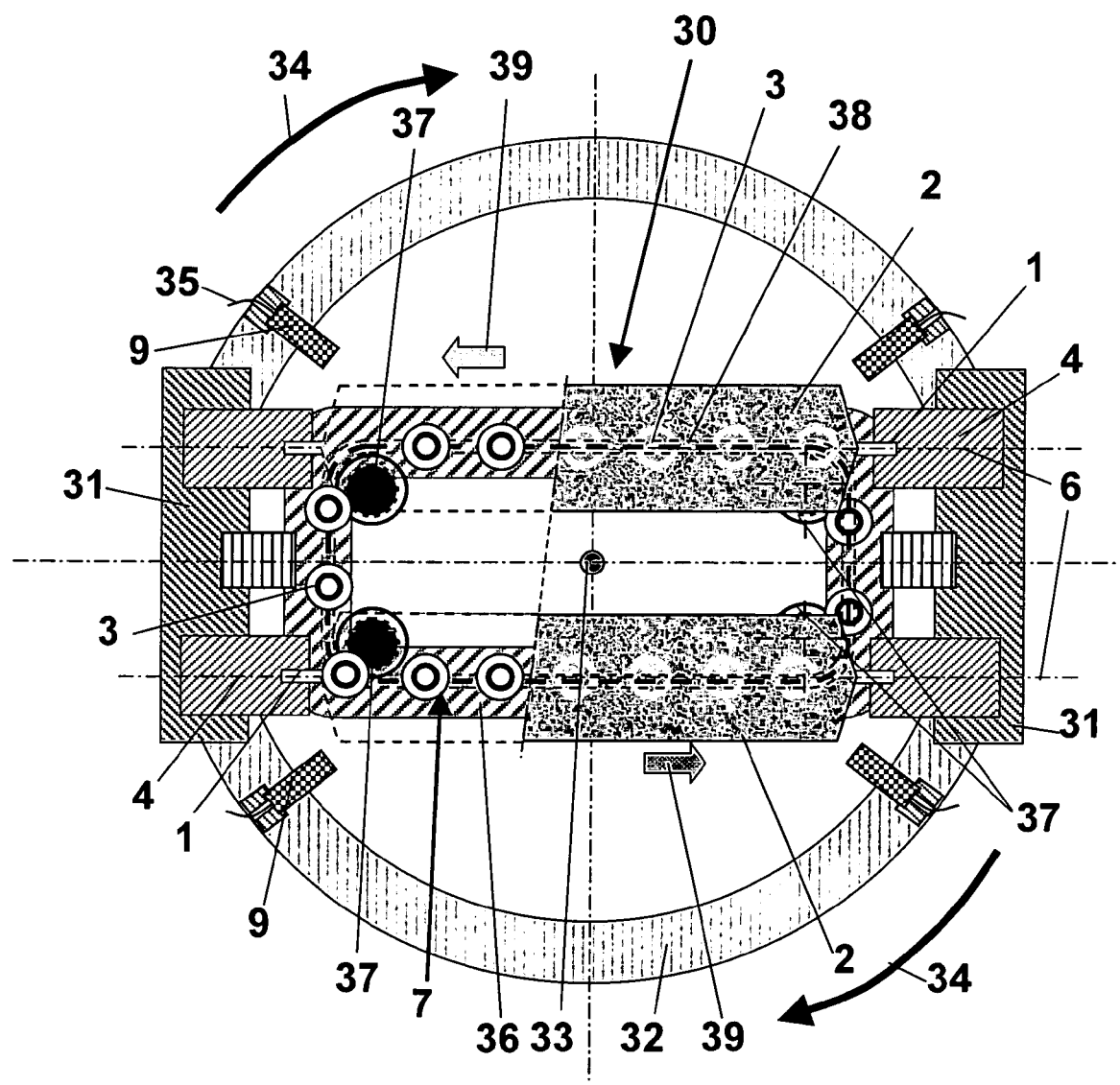
Figure 4:
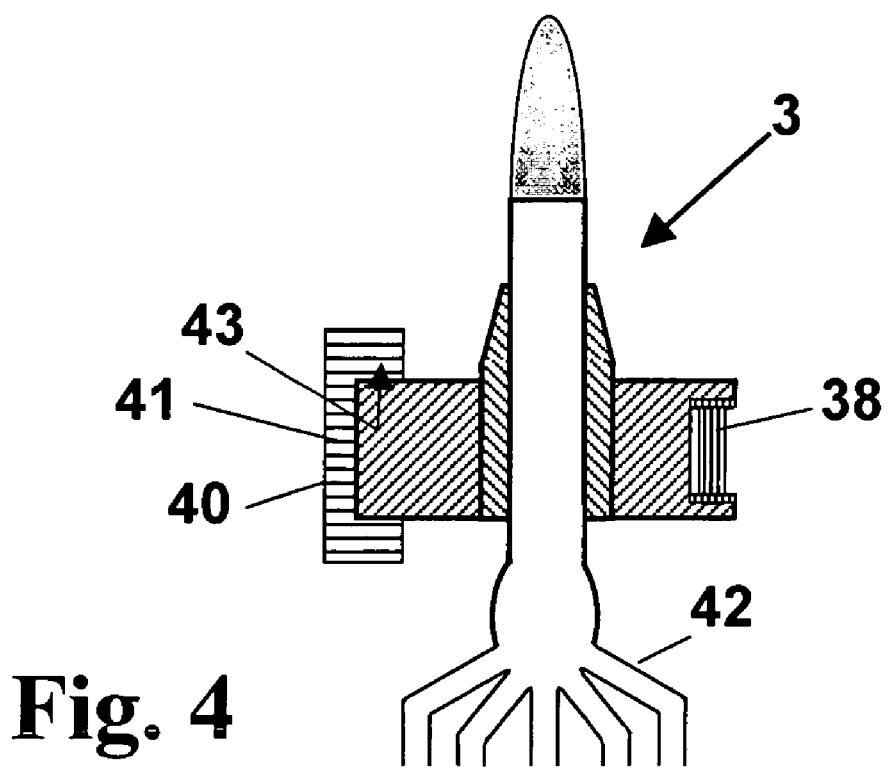
Figure 5:
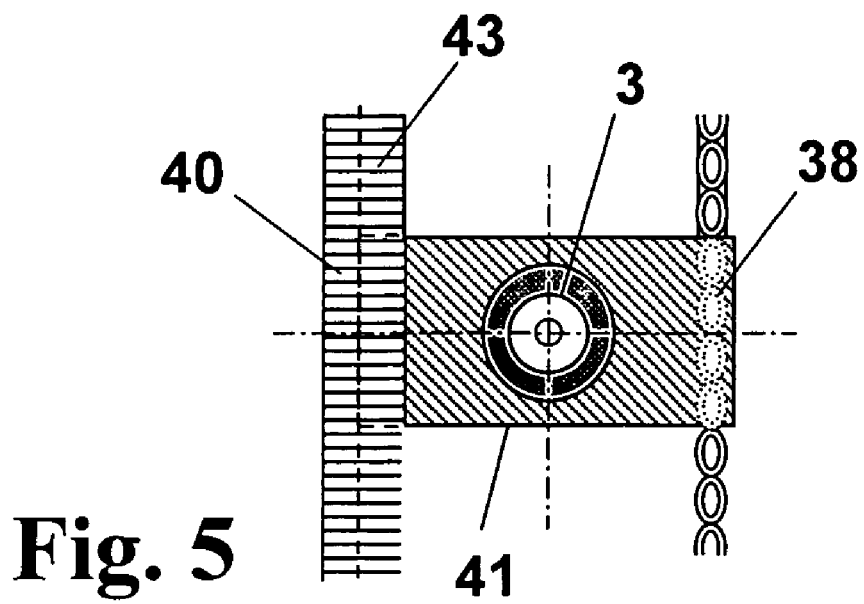

The invention shall now be explained in more detail with reference to embodiments and a drawing. The drawing shows in detail in schematic illustration in FIG. 1: a first variant of the apparatus of the invention for performing a first variant of the method of the invention with a long horizontal row of burners along which two deposition paths with transportable substrate bodies are extending, in a view from above onto the substrate body;

FIG. 2: a second variant of the apparatus of the invention for performing a further variant of the method of the invention, with an arrangement of a plurality of substrate bodies that are transportable around a deposition path along a double row of burners, in a view from above onto the substrate bodies;

FIG. 3: a further variant of the apparatus of the invention for performing a further variant of the method of the invention, with an arrangement of two substrate bodies that are rotatably supported about a joint vertical axis of rotation in a substrate body plane, together with a burner arrangement provided underneath the substrate body plane, with deposition burners directed onto the substrate bodies, in a view from above onto the substrate bodies, partly in section;

FIG. 4: a detail of a drive for a circulating movement of the deposition burners in the apparatus shown in FIG. 3, in a side view;

FIG. 5: the detail of the drive according to FIG. 4 in a top view; and

Figure 6:
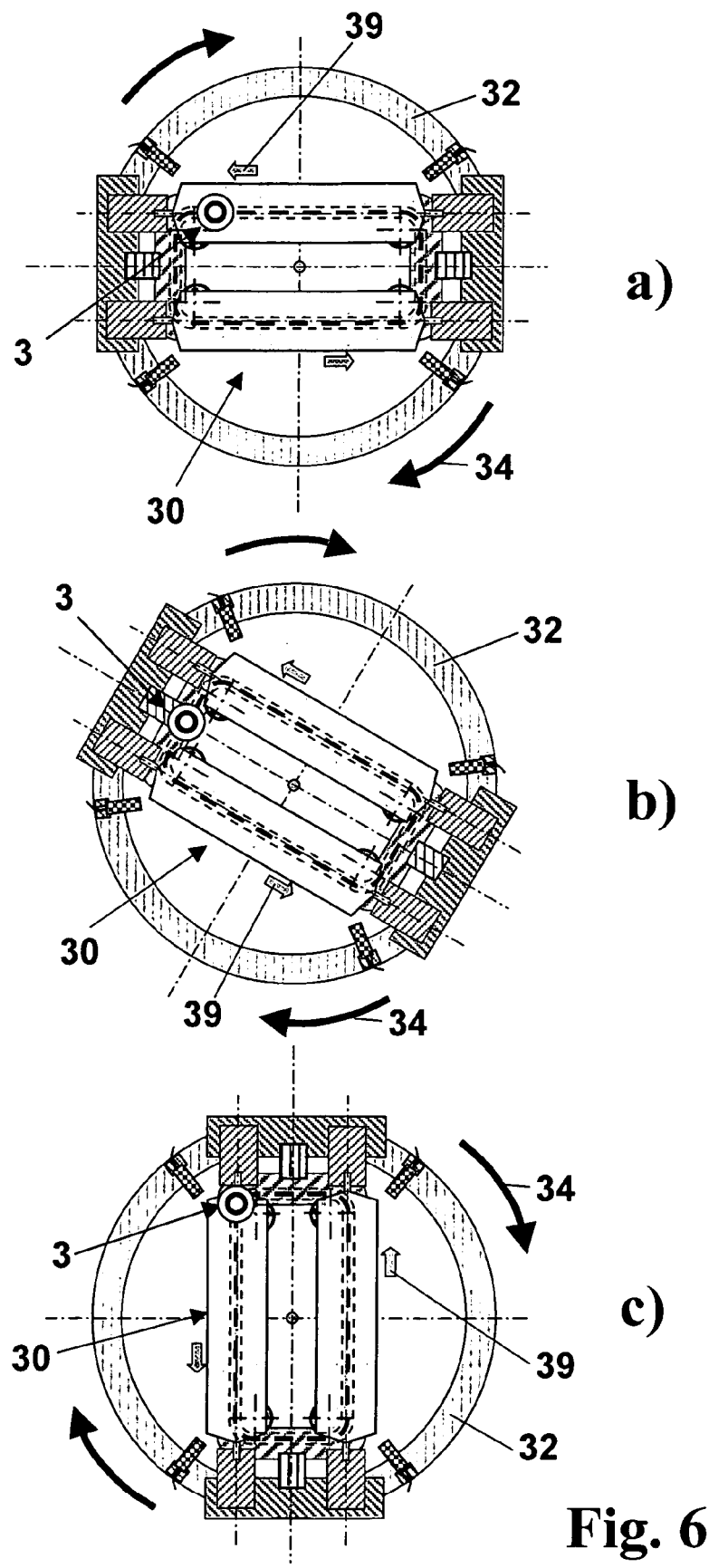

FIG. 6: also in top view, various movement phases a), b) and c) during rotation of the apparatus shown in FIG. 3 about the vertical axis of rotation.

In the embodiments of the invention, which will be explained in more detail in the following, a porous $SiO_2$ soot body 2 is formed on a carrier 1 by means of the known OVD (outside vapor deposition) method in that $SiCl_4$, hydrogen and oxygen are supplied to deposition burners 3 via media supply lines separated from one another, $SiO_2$ particles are formed therefrom by hydrolysis in a burner flame assigned to each deposition burner 3, and the $SiO_2$ particles are layerwise deposited on the carrier 1 with gradual buildup of the porous $SiO_2$ soot body 2. The illustrations in FIGS. 1 to 6 are of a purely schematic nature and are not true to scale.

FIG. 1 shows an embodiment of the apparatus of the invention for performing a first variant of the method of the invention, in which a plurality of carriers 1 are moved in two parallel buildup or assembly paths A, B one after the other along an elongated joint burner path 7.

The burner path 7 is symbolized in FIG. 1 by a dash-dotted line. It is composed of a plurality of deposition burners 3 which are arranged in a row and by means of which $SiO_2$ particles are deposited on the carriers 1 and built up layerwise to form a respective soot body 2.

The individual deposition burners 3 are stationary in axial direction of the burner path 7, but are supported in a displaceable manner in a direction transverse to the burner path 7, so that each deposition burner 3 can alternately serve the two assembly paths A, B. The deposition burners 3 are arranged underneath the assembly paths A, B and can be oriented towards the longitudinal axis of the carriers 1 vertically and inclined up to an angle of about 30°. Moreover, the deposition burners 3 are also displaceable in a direction perpendicular to the plane of paper to observe a constant distance from the gradually increasing soot bodies 2. The supply of the process media, hydrogen, oxygen, and silicon tetrachloride is separately adjustable for each of the deposition burners 3.

The axial distance of the deposition burners 3 relative to one another is 10 cm and the length of the burner path 7 is on the whole 30 m and the distance of the assembly paths A, B is 30 cm.

The carriers 1 are each configured in the form of an aluminum oxide tube which is held at both sides by means of a lathe 4 and is rotatable about its longitudinal axis 6. The lathe 4 is mounted on a transportation slide 5 which can be transported on rails along the burner path 7 in the direction of directional arrows 8. At both sides of a predetermined deposition area, which corresponds to the length of a soot body 2, electric infrared radiant heaters 9 are directed towards the carrier 1. Each transportation slide 5 is equipped with a separate drive for performing the axial movement along its assembly path A, B and for performing the rotation of the soot body 2, and is connected to the corresponding electrical terminal lines for the drives and the electric radiant heaters 9. In this embodiment and also in the ones described in more detail in the following, all transportation slides 5 and the buildups or assemblies thereon are of the same construction.

The carriers 1 are axially distributed on the two assembly paths A and B in axial direction such that the developing soot bodies 2 are arranged relative to each other in gapwise configuration.

The method of the invention shall now be explained in more detail by way of example with reference to the apparatus according to FIG. 1.

For the preparation of a porous $SiO_2$ soot body having a length of 3 meters in a single passage over the assembly paths A, B, the transportation slide 5 is moved at a speed of 5 cm per minute along the burner path 7. The carriers 1 are rotated in this process with 20 revolutions per minute about their longitudinal axis 6.

The above-mentioned process media are supplied to the deposition burners. A burner flame is formed whose direction of propagation in the illustration of FIG. 1 extends in a direction perpendicular to the plane of sheet and which is oriented towards the longitudinal axis 6 of the soot body 2. In the burner flames $SiO_2$ particles are formed, and these are deposited layerwise on the outer surface of the carrier 1 or the developing soot body 2, respectively.

The amount of the burner gases hydrogen and oxygen is continuously raised with an increasing diameter of the soot bodies 2, so that the surface temperature of the soot bodies 2 remains approximately constant. At the same time the distance to the soot body surface is kept approximately constant by lowering the deposition burners 3.

The soot bodies 2 are arranged on the assembly paths A and B such that they are offset relative to one another. As soon as the transportation slide has reached a position on the assembly path A from which material deposition of a deposition burner 3 would take place outside the intended deposition area on the carrier 1 or on the lathe 4, the corresponding deposition burner 3 is shifted towards the assembly path B where the $SiO_2$ particle deposition is continued on the soot body 2 which is "arranged in gapwise configuration". In FIG. 1 those deposition burners 3a that upon continued axial displacement of the carriers 1 are pivoted around as the next ones onto the opposite assembly path A, B are marked with a corresponding directional arrow.

Due to the alternate operation of the deposition burners 3 on the one and the other assembly path A, B, a continuous use of the deposition burners 3 and thus high efficiency are achieved, and deposition of $SiO_2$ particles outside the predetermined deposition area is prevented at the same time.

The method of the invention permits a homogeneous deposition of $SiO_2$ particles with a high deposition rate and without reversal of the direction of movement during the deposition process, twists of the media supply lines to the deposition burners 3 being ruled out in the absence of a rotational or circular movement of the deposition burners 3.

Transparent quartz glass bodies that are distinguished by a particularly high homogeneity and freedom from bubbles are obtained from the resulting soot bodies 2 by subsequent vitrification and possible further treatment and deformation steps.

If like reference numerals as in FIG. 1 are used in FIGS. 2 to 6, these designate like or equivalent parts of the apparatus as the corresponding reference numerals in FIG. 1. Corresponding explanations become apparent from the above observations.

In a modification of the above-described method using the apparatus described with reference to FIG. 1, the soot bodies 2 are built up by passing repeatedly through assembly paths A, B. The transportation slide 5 is here returned to the start position each time, the soot bodies 2 being preheated before each passage to a predetermined temperature approximately corresponding to the temperature during the deposition process.

The illustration of FIG. 2 schematically shows an embodiment of the apparatus of the invention for the simultaneous buildup or assembly of a plurality of soot bodies 2 during circulation around a closed assembly path 20. The assembly path comprises two elongated parallel pieces 21, 22 that are interconnected at the ends by means of semicircular arcs 23. A straight burner row 7a, 7b composed of a plurality of deposition burners 3, each having a distance of 15 cm from one another, extends along each of the parallel pieces 21, 22. The deposition burners 3 are stationary in axial direction.

A plurality of transportation slides 5 on which carriers 1 are mounted for the deposition of soot bodies 2 are continuously transported along the assembly path 20 and moved in this process one after the other along the deposition burners 3, as shown by directional arrows 25. The distance between the transportation slides 5 can be limited to a minimum.

A further embodiment of the method of the invention will now be explained in more detail with reference to the apparatus according to FIG. 2.

For the preparation of porous $SiO_2$ soot bodies 2 having a length of 3 meters each, use is made of burner rows 7a, 7b having a length of 15 m. Along said rows the transportation slides 5 are moved at a speed of 20 cm per minute, the carriers 1 being simultaneously rotated with 30 revolutions per minute about their longitudinal axis 6.

The deposition burners 3 are supplied with the above-mentioned process media. A burner flame is formed having a direction of propagation in the illustration of FIG. 2 oriented towards the longitudinal axis 6 of the soot body 2, slightly inclined (by about 30°) relative to the vertical. In the burner flames SiO$_2$ particles are formed which are layerwise deposited on the outer surface of the carrier 1 and of the developing soot body 2.

The amount of the burner gases hydrogen and oxygen is continuously raised with an increasing diameter of the soot bodies 2, so that the surface temperature of the soot bodies 2 remains approximately constant, and the distance to the soot body surface is kept approximately constant at the same time by lowering the deposition burners 3.

The supply of SiCl$_4$ can be switched on and off separately for each deposition burner 3, and the mass passage for the burner gases is individually variable in addition. The SiCl$_4$ supply is switched off in response to the position as soon as a deposition burner 3 is directed onto an area outside of the deposition area provided for, so that particle deposition on the carrier 1 or on the lathe 4 is avoided. At the same time, the burner gas supply is throttled, but only to such a degree that the burner flame is not extinguished. The SiCl$_4$ supply is again activated and the burner gas supply is adjusted to the standard value as soon as the deposition burner 3 is again directed onto a soot body 2. For the purpose of illustration the deposition burners 3 without current SiCl$_4$ supply are shown as circles with a white rim in the process stage illustrated in FIG. 2, and the deposition burners 3 with SiCl$_4$ supply are shown with a gray rim.

Furthermore, the deposition burners 3 are used for consolidating the end portions of the developing soot bodies 2. To this end the deposition burners 3 which are located in the area of a soot body end cap are supplied in response to the position with an increased amount of burner gases, so that a higher flame temperature is obtained that will lead to a stronger consolidation of the SiO$_2$ soot material in the area of the end caps. The deposition burners 3 with such a current action in the process stage of FIG. 2 are marked with a block arrow 26 directed onto the respective soot body end portion.

The transportation slides 5 pass through the area of the arcs 23 as fast as possible during transfer from piece 21, 22 to the other piece 22, 21 so as to minimize the cooling down of the soot body surface. To this end the SiCl$_4$ supply is switched off in the deposition burners 3 which are still active as the last ones, and the transportation slide 5 is moved to the first deposition burners of the other row of burners 7a, 7b. In the case of these burners, the SiCl$_4$ supply is first switched off as well. The soot body 2 is moved along the deposition burner 3 with the above-mentioned speed of 20 cm per minute over a path of 2 to 3 burner distances, it is preheated in this process and the SiCl$_4$ supply of the deposition burners that are then in the active state is switched on.

Due to the small distance between neighboring soot bodies 2, an almost continuous use of the deposition burners 3 and thus a high efficiency are achieved. This variant of the method according to the invention also permits a homogeneous deposition of SiO$_2$ particles at a high deposition rate and without reversal of the direction of movement in the deposition process, twisting of the media supply lines leading to the deposition burners 3 being ruled out in the absence of a rotary or circular movement of the deposition burners 3, and constructionally complicated rotary leadthroughs for the media supply or complicated path guides for the deposition burners 3 being dispensed with.

In a modification of the above-described method, the soot body 2 is heated in the area of the arcs 23 in that the terminal deposition burners 3 of the row of burners 7 are movably supported around the arcs 23, thereby accompanying, together with the transportation slides 5, the transfer of the soot bodies 2 from the one piece 21, 22 to the other piece 22, 21 of the assembly path 20 with maintenance of the axial relative displacement. Subsequently, the terminal deposition burners 3 are again returned to their initial position.

A particularly preferred embodiment of the invention is schematically shown in FIG. 3. The figure is a top view on an arrangement 30 of two parallel-arranged carriers 1, each having a soot body 2 built thereon. The ends of the carrier 1 are clamped by a lathe by means of which the carrier is rotatable about its longitudinal axis 6. The carrier arrangement 30 is rigidly mounted via a bearing 31 on a rim 32, which is part of a rotary device, by means of which the arrangement 30 is rotatable about a vertical rotational axis 33 extending centrally between the two longitudinal axes 6 and vertically relative to the plane of paper. The rotational direction is symbolized by the directional arrows 34. Moreover, four infrared radiant heaters 9 are mounted on rim 32, the heaters being directed onto the front ends of the two soot bodies, and connected via electrical terminals 35 and sliding contacts to a source of current.

The longitudinal axes of the two soot bodies 2 generate a soot body plane. In the top view of FIG. 3, said soot body plane has positioned thereunder a frame 36 which is secured to the rim 32 and which is also rotatable about the rotational axis 33 and which generates a rectangular surface with rounded corners extending in parallel with the soot body plane. In the area of the corners of the rectangular frame, four support points 37 are provided around which a metallic burner chain 38 is stretched.

At a predetermined distance of 10 cm the burner chain 38 has secured thereto deposition burners 3 which are vertically oriented upwards. One of the support points 37 simultaneously serves as a chain drive by means of which the burner chain 38 can be transported together with the deposition burners 3 mounted thereon in the direction illustrated by the directional arrows 39 in a circulating path 7 around the frame 36, the surrounding rectangular frame 36 serving at the same time as a guide rail 40 (see FIG. 4) for the deposition burners 3.

The circulating path 7 of the deposition burners 3 follows the longitudinal axes 6 of the carriers 1 and the soot bodies 2. The extension of the circulating path 7 can be seen in FIG. 3, the deposition burners 3 being illustrated as concentric circles and the deposition burners 3, which are hidden by the soot bodies 2, being shown in transparent form.

The frame 36 can be moved up and down in the direction of the rotational axis 33 to adjust the distance of the deposition burners 3 from the soot body surface.

A guide rail 40, which is shown in detail in FIGS. 4 and 5, extends around the circulating path. The deposition burner 3 is firmly mounted in a holding block 41 to be exchangeable in an easy manner. The flexible media supply lines in the form of hoses of PTFE are marked with reference numeral 42. The holding block 41 is displaceably guided on the one hand in a slide groove 43 of the guide rail 40 and on the other hand it is firmly connected to the burner chain 38, so that the deposition burners 3 can be transported by means of the burner chain 38 along the guide rail 40, the guide rail forming a defined planar path guidance. The burner chain 38 ensures a constant distance of the deposition burners 3 of 10 cm from one another in the area of the straight paths along the longitudinal axis of the soot body.

A further embodiment of the method according to the invention using the apparatus schematically shown in FIGS. 3 to 5 shall be explained in more detail with reference to FIG. 6.

For producing two porous SiO$_2$ soot bodies 2 with a length of 3 m each, the carriers 1 which are clamped into lathe 4 are rotated about their longitudinal axis 5 and at the same time they are continuously rotated by the rotary device 32 around the vertical rotational axis 33 in the direction of the directional arrows 34. The arrangement of the deposition burners 3, which are supported on the frame 36 to be transportable, is also continuously rotated about the same rotational axis 33 in the same direction of rotation and at the same rotational speed. Hence, the position of the surrounding burner path upon rotation about the rotational axis 33 is continuously adapted to the shape of the soot body arrangement.

Due to the joint rotation of soot body arrangement and frame 36, the support points 37 of the circulating burner chain 38 are assigned all the time to the corners of the rectangle generated by the soot body 2. The deposition burners 3 are continuously shifted in the direction of directional arrow 39 by means of the burner chain 38 rotating opposite to the rotational direction 34, so that a constant relative movement is achieved between the deposition burners 3 and the soot body surface, the relative movement leading to a uniform layerwise deposition of $SiO_2$ particles on the outer surface of the carrier 1. The transportation of the deposition burners 3 in a direction opposite to the direction of rotation 34 prevents torsion and twisting of the media supply lines 42 of the deposition burners 3. The necessary electrical terminals for the lathes 4, the chain drive and the radiant heaters are guided over sliding contacts, so that no twists can occur.

The rotational speed of the rotary device and the transportation speed of the chain drive are matched to one another such that a rotation of the soot body arrangement and of the deposition burner arrangement by 360° is accompanied by a complete circulation of the deposition burners 3 around the circulating path. At a length of the burner chain of 7 m and a relative speed of 60 cm/min, a rotation of the rotary device and a complete circulation of the burner chain 38 last for about 11.7 min in the embodiment. This ensures that the media supply lines 42 of the deposition burners 3 have exactly the same state of twist after each passage as at the beginning of the passage.

The media supply is separately adjustable for each deposition burner 3. It is thereby possible to meter the supply with $SiCl_4$ as required, and particularly to switch it on and off, and it is also possible to vary the temperature of the soot body 2 by varying the burner gases. The amount of the burner gases is continuously raised with an increasing diameter of the soot bodies 2, so that the surface temperature of the soot body 2 remains approximately constant, but the distance relative to the soot body surface is also kept approximately constant at the same time by lowering the platform 36.

The opposite movement of soot bodies 2 (vertical rotation) and deposition burners 3 (translation) is schematically shown in movement phases a), b) and c) in FIG. 6, only a single deposition burner 3 of the whole burner row being illustrated for the sake of clarity.

In the phase shown in FIG. 6a), the deposition burner 3 is active. It is positioned directly underneath the one soot body 2 and is directed onto the longitudinal axis 6 thereof.

In phase b), which arises after further rotation of the soot body arrangement by about 30° relative to phase a) and a transportation of the deposition burners 3 opposite to the rotational movement by about 58 cm, the deposition burner 3 is not active, the supply of $SiCl_4$ is deactivated and the burner gases are unchanged. In this phase there is no $SiO_2$ particle deposition on the soot body 2.

In phase c), the soot body arrangement has been rotated by 90° in comparison with the position in phase a), and the deposition burner 3 has been transported by means of the burner chain 38 by 1.75 m along the circulating path in opposite direction. It is now active again and is located directly underneath the other soot body 2 and directed onto the longitudinal axis 6 thereof.

In a modification of the above-described method the deposition burner is transported around the circulating path not by a joint drive chain, but by means of a separate drive for each deposition burner 3. It is thereby possible to transport the deposition burners 3 in the areas of the circulating path where no deposition of $SiO_2$ particles takes place, at a faster speed, thereby lowering the number of the deposition burners required for a complete occupation of the circulating path, from 70 to 64.

In a further modification of the above-explained variants of the method, the deposition burners 3 are used instead of the separate radiant heaters 9 for the consolidation of the soot body ends. The burner gas amounts are changed to this end in response to the position of the deposition burners 3 in the area of the soot body ends such that a higher surface temperature is set. To this end the deposition burners 3 must be supplied with burner gases independently of one another.

The invention claimed is:

1. A method for producing a glass body, said method comprising: forming a cylindrical blank by successive deposition of a plurality of material layers on an outer surface of a substrate body which is rotating about a longitudinal axis thereof using an arrangement of a plurality of depositors which are directed onto the substrate body and which are fed via supply lines with process media for material layer deposition and which are moved without reversal of direction of movement thereof along the longitudinal axis of the substrate body, and wherein the movement of the depositor arrangement along the longitudinal axis of the substrate body is accompanied by a displacement of the substrate body, wherein the displacement includes a rotation of the substrate body about a rotational axis extending in a direction transverse to the longitudinal axis of the substrate body.

2. The method according to claim 1, wherein the depositor arrangement is rotated together with the substrate body continuously about the rotational axis, the depositors being simultaneously transported continuously around a circulating path in an opposite direction relative to the displacement of the depositor arrangement caused by the rotation.

3. The method according to claim 2, wherein the depositors are transported on the circulating path at respective speeds that are independently adjustable from each other.

4. The method according to claim 1, wherein at least one additional substrate body with a longitudinal axis is combined with the substrate body to form a substrate body arrangement having a fixed shape, and wherein the longitudinal axes of the substrate bodies extend in a joint substrate body plane, and wherein the substrate body arrangement is rotated about the rotational axis, the rotational axis extending in a direction transverse to the substrate body plane.

5. The method according to claim 4, wherein upon rotation about the rotational axis, a position or a shape of the depositor arrangement is continuously adapted to a shape or a position of the substrate body arrangement.

6. The method according to claim 5, wherein the substrate bodies are arranged in the substrate body plane along the sides of a polygon, and wherein the depositor arrangement is supported in a depositor plane extending substantially in parallel with the substrate body plane, and the depositors are transported in a circulating path along the substrate body arrangement in an opposite direction relative to the rotation of the substrate body arrangement.

7. The method according to claim 5, wherein two parallel-arranged substrate bodies form the substrate body arrangement in a form of a rectangle having two long sides, the substrate bodies being arranged at the long sides of the rectangle.

8. The method according to claim 4, wherein the depositor arrangement is rotated together with the substrate body continuously about the rotational axis, the depositors being simultaneously transported continuously around a circulating path in an opposite direction relative to the displacement of the depositor arrangement caused by the rotation; and wherein a rotation of the substrate body arrangement and the depositor arrangement by 360° is accompanied by a complete circulation of the depositor arrangement around the circulating path.

9. The method according to claim 1, wherein the rotational axis extends in a vertical direction.

10. The method according to claim 1, wherein the depositor arrangement forms at least one depositor path with a length greater than a length of the blank to be produced, and wherein the displacement of the substrate body is performed in the direction of the longitudinal axis thereof along the depositor path, with measures being taken for preventing material deposition in the area outside of the blank ends.

11. The method according to claim 10, wherein a plurality of additional substrate bodies forming an assembly path pass through the depositor path in a successive arrangement.

12. The method according to claim 1, wherein the depositors comprise deposition burners which are fed with starter material for the material to be deposited and wherein the supply of the starter material can be adjusted individually for each deposition burner.

13. The method according to claim 12, wherein at least the supply of the starter material for each deposition burner can be adjusted in response to the position of the substrate body.

14. The method according to claim 1, wherein electric additional heaters are provided which heat front ends of the blank as said blank is formed, and are displaced in stationary fashion with the substrate body.

15. The method according to claim 1, wherein at least one additional substrate body with a longitudinal axis is combined with the substrate body to form a substrate body arrangement having a fixed shape, and wherein the longitudinal axes of the substrate bodies extend in a joint substrate body plane, and wherein the substrate body arrangement is rotated about the rotational axis, the rotational axis extending in a direction perpendicular to the substrate body plane.

16. A method for producing a glass body, said method comprising: forming a cylindrical blank by successive deposition of a plurality of material layers on an outer surface of a substrate body which is rotating about a longitudinal axis thereof using an arrangement of a plurality of depositors which are directed onto the substrate body and which are fed via supply lines with process media for material layer deposition and which are moved without reversal of direction of movement thereof along the longitudinal axis of the substrate body, and wherein the movement of the depositor arrangement along the longitudinal axis of the substrate body is accompanied by a displacement of the substrate body, wherein the displacement includes a rotation of the substrate body about a rotational axis extending in a direction perpendicular to the longitudinal axis of the substrate body.

* * * * *